United States Patent [19]

Umehara

[11] Patent Number: 4,887,068
[45] Date of Patent: Dec. 12, 1989

[54] DISPLAY CONTROL APPARATUS FOR USE IN INTERNAL COMBUSTION ENGINE

[75] Inventor: Kazuhiro Umehara, Hamamatsu, Japan

[73] Assignee: Suzuki Jidosha Kogyo Kabushiki Kaisha, Shizuoka, Japan

[21] Appl. No.: 129,321

[22] Filed: Dec. 3, 1987

Related U.S. Application Data

[62] Division of Ser. No. 900,875, Aug. 27, 1986, abandoned.

[30] Foreign Application Priority Data

Sep. 30, 1985 [JP] Japan .................................. 60-216368

[51] Int. Cl.⁴ ................................................ B60Q 1/00
[52] U.S. Cl. ................................. 340/450.3; 340/624; 73/308
[58] Field of Search ................ 123/335, 196 S, 198 D, 123/198 DC; 340/52 R, 52 F, 52 D, 59, 60, 618, 624, 625, 623; 73/304 R, 319, 305, 307, 308

[56] References Cited

U.S. PATENT DOCUMENTS

| | | | |
|---|---|---|---|
| 4,053,868 | 10/1977 | Cox et al. | 340/52 F |
| 4,080,828 | 3/1978 | Akito et al. | 340/624 X |
| 4,147,151 | 4/1979 | Wright | 123/335 |
| 4,218,998 | 8/1980 | Hill | 123/335 |
| 4,361,835 | 11/1982 | Nagy | 340/624 |
| 4,459,951 | 7/1984 | Tobinaga | 123/335 |
| 4,492,197 | 1/1985 | Yamamoto | 123/198 DC |
| 4,524,736 | 6/1985 | Sackett | 123/198 DC |
| 4,562,801 | 1/1986 | Koike | 123/198 DC |
| 4,606,315 | 8/1986 | Tobinaga | 123/198 DC |
| 4,641,618 | 2/1987 | Dogadno | 123/198 DC |

FOREIGN PATENT DOCUMENTS

| | | |
|---|---|---|
| 48-86561 | 11/1973 | Japan . |
| 57-131820 | 8/1982 | Japan . |
| 60-36510 | 3/1985 | Japan . |
| 60-85210 | 5/1985 | Japan . |

Primary Examiner—Joseph A. Orsino
Assistant Examiner—Jeffery A. Hofsass
Attorney, Agent, or Firm—Flynn, Thiel, Boutell & Tanis

[57] ABSTRACT

A display control apparatus for use in an internal combustion engine includes: a CDI type ignition circuit; an overspeed preventing circuit which can limit the engine speed to a restricted value; a first LED display unit of the light on/off type to display the amounts of oil and/or cooling water; a second LED display unit to display the circulation state of the oil and/or cooling water; and a drive circuit which switches the first and second display units to an alarm display mode and causes the overspeed preventing circuit to limit engine speed when abnormal states of the oil and/or cooling water are detected by oil level switches or by water and oil flow sensors. If power ceases, the display state is held by keep relays. When an abnormal state is detected, the driver is warned by lighting up of red LEDs and by generating a beeping sound from a buzzer.

12 Claims, 4 Drawing Sheets

DISPLAY CONTROL APPARATUS FOR USE IN INTERNAL COMBUSTION ENGINE

This is a division of Ser. No. 900,875, filed Aug. 27, 1986, now abandoned.

FIELD OF THE INVENTION

The present invention relates to a display control apparatus for an internal combustion engine and, more particularly, to a display control apparatus of the type in which, when abnormal levels of oil and cooling water of the internal combustion engine are detected, an alarm is indicated by a display section and the rotating speed of the engine is limited to a preset speed so that the abnormal condition is positively relayed to the driver.

BACKGROUND OF THE INVENTION

A light emitting diode (LED), a lamp, or a liquid crystal display (LCD) is generally used in a display section to present information about an internal combustion engine. This display section is responsive to amounts of oil and cooling water in the engine and flickers when they are reduced to levels below predetermined values. In this way, the abnormal condition is relayed to the driver, thereby preventing a condition such as burn-out, overheating, or the like of the engine.

The conventional control apparatus for the display of the internal combustion engine is provided with, for example, an oil level switch having a plurality of contacts. Each of these contacts is connected to an indicating lamp. A float with a magnet is adapted to be vertically movable in dependence on the amount of oil. A contact which is disposed at the position where it faces, or in other words is vertically aligned with, the float is turned on, so that the associated indicating lamp is lit. (This apparatus has been disclosed in Unexamined Japanese Patent Publication No. 86561/1973). According to the above apparatus, the vertical position of the float changes in accordance with the amount of oil, and indicating lamps are lit so that the amount of oil can be discerned by the driver.

However, in such an oil amount display apparatus, the oil level switch and indicating lamps are merely directly connected. When this apparatus is used in an outboard engine, the float always moves vertically due to the waves. Thus, there is the problem that one or more of the contacts are rapidly turned on and off and thus one or more of the indicating lamps are repeatedly turned on and off, so that the oil amount cannot be accurately indicated.

In addition, when the oil tank is attached to the outboard engine, the whole engine assembly has a fairly deep shape. To sequentially light up the indicating lamps, the contacts must be overlappingly attached within a predetermined range. Therefore, in the case of attaching the respective contacts at many positions from the top (the oil level when the tank is filled with oil) to the bottom (the level when the tank is empty), the number of contacts increases and at the same time it is necessary to provide additional space in the horizontal direction to overlappingly attach the contacts. Consequently, it is difficult to manufacture the oil amount display apparatus so that those contacts are inserted into a pipe and the float is attached to the outer periphery of the pipe and vertically moved. There is also the drawback that the outboard itself increases in size.

Further, even when a lot of indicating lamps are attached, only one of the lamps corresponding to the current vertical position of the float is ordinarily used at any given moment. Thus, there are the drawbacks that the efficiency of use of the indicating lamps is bad and the indicating effect to positively present the oil amount to the driver is small.

There has been known another display control apparatus in which the oil amount and the temperature of the engine are detected and the ignition apparatus is temporarily interrupted if the oil amount decreases to a level below a predetermined value or the engine temperature exceeds a predetermined value, thereby limiting the engine speed. Namely, when the oil amount is below a predetermined level, the oil level switch is turned on and the ignition apparatus connected to this switch is made inoperative, thereby limiting the engine speed. On the other hand, the engine temperature is detected by a heat sensor. When the engine temperature is above a predetermined value, the heat sensor is turned on and the ignition apparatus connected to this sensor is made inoperative, thereby reducing the engine speed. Upon limitation of the engine speed, the display section, consisting of light emitting diodes or the like, is lit up, thereby informing the driver about the abnormal condition of the oil amount or engine temperature.

However, when the engine is used at a speed below the predetermined speed, the display device is not lit, the ignition apparatus continues to operate and the engine speed is not limited. Thus, there is the problem that burn-out, overheating, or the like of the engine may occur.

The following technologies can be mentioned as prior arts of the present invention.
(1) JP-A 48-86561
(2) JP-A 57-131820
(3) JP-A 60-85210 (JP-A: Official Gazette of Japanese Patent Unexamined Publication)
(4) Official Gazette of Japanese Utility Model Unexamined Publication No. 36510/1985

(1) Since the outline of the invention disclosed in JP-A 48-86561 has already been described, its description is omitted here.

(2) Outline of the invention disclosed in JP-A 57-131820:

1. The pressure of cooling water is detected by the water pressure sensor. The buzzer rings when the pressure of cooling water is below a predetermined value. The water pressure sensor is held inoperative when the rotating speed of engine is below a predetermined speed. Thus, the set pressure of the water pressure sensor can be increased. The allowable period of time after the water pressure sensor was made operative until the temperature sensor at the next stage is made operative can be prolonged. Various countermeasure can be taken. The safety can be improved.

2. The prior art invention differs from the present invention with respect to the following points. The prior art invention doesn't have the light on/off type first display unit for displaying the states of oil amount and cooling water amount and the second display unit for displaying the circulating states of the oil and/or cooling water. The operator cannot know the oil amount and cooling water amount, or circulating states of the oil and cooling water. The operator cannot clearly know by which abnormal condition the rotation was restricted. The prior art invention is practically disadvantageous and inconvenient. Also, in the case of using the engine at a speed below the predetermined speed, the water pressure sensor doesn't operate. Thus, there is the risk such that the engine could be undesirably burnt out and damaged.

(3) Outline of the invention disclosed in JP-A 60-85210:

1. The lower limit of the oil level of a ship engine is detected by the oil level switch. The oil level switch is maintained in the lower limit state of the oil level by the self-holding circuit. The engine is driven at a low speed by the low speed maintaining circuit on the basis of the output from the oil level switch. The oil level is indicated by lighting up the green, orange, or red lamp. When the red lamp is lit up, the buzzer rings. The self-holding circuit is reset by turning off the main switch.

Thus, the oil level is set into the lower limit state, the oil level switch is turned on, and the low speed operation is executed by the oil level switch. In this case, even if the oil is added with the low speed operating state maintained, the engine won't suddenly rotate at a high speed. The fear such that the ship is promptly accelerated can be prevented and the safety is improved.

2. The prior art invention differs from the present invention with respect to the following points. The prior art invention doesn't have the light on/off type first display unit for displaying the states of oil amount and cooling water amount and the second display unit for displaying the circulating states of the oil and/or cooling water. The operator cannot perceive nor know the oil amount and cooling water amount, or the circulating states of the oil and cooling water. Thus, the prior art invention is practically disadvantageous and inconvenient. On the other hand, in the low speed operating state, for example, when it is difficult to supply the oil during the sailing of a ship or the like and in the case of the emergency refuge because of the deterioration of weather or the like, the low speed operating state cannot be released, nor the ship cannot be rapidly refuged. Thus, the prior art invention is practically disadvantageous and inconvenient.

(4) Outline of the invention disclosed in the Official Gazette of Japanese Utility Model Unexamined Publication No. 36510/1985:

1. When the oil level switch is closed, the ignition spar controlled by the controller. The ON-state of the oil level switch is held by the holding circuit. These circuits are used as the power sources of the ignition circuit of the magnet.

Thus, the prior art invention can be also used in an outboard engine having no battery. The burning-out of the engine can be prevented by a proper alarm. When the oil level is below a specified amount, the oil level switch is made operative, so that a current flows through the light emitting diode and the alarm state is continued by the holding circuit. At this time, no spark occurs from the spark plug and the engine rotating speed is maintained to below a fixed rotating speed.

2. The prior art invention differs from the present invention with regard to the following points. The prior art invention doesn't have the light on/off type first display unit for displaying the states of oil amount and cooling water amount and the second display unit for displaying the circulating states of oil and/or cooling water. The operator cannot know the oil amount and cooling water amount, or the circulating states of oil and cooling water. The operator cannot clearly know by which abnormal condition the rotation was restricted. Thus, the prior art invention is practically disadvantageous and inconvenient.

SUMMARY OF THE INVENTION

It is an object of the present invention to provide a display control apparatus for use in an internal combustion engine in which the amounts of oil and cooling water can be perceived and in which the structure is simple and the cost is low.

This object is accomplished by providing a display control apparatus for use in an internal combustion engine which includes: a CDI type ignition circuit; an overspeed preventing circuit which has a rotating speed detecting circuit and which can limit the rotating speed of the engine to a predetermined restricted value; a first display unit of the light on/off type to display an amount of oil and/or an amount of cooling water; a second display unit to display the circulation states of the oil and/or cooling water; and a drive circuit for switching the operating modes of the first and second display units to an alarm display mode when abnormal states of the oil and/or cooling water are detected and at the same time making the overspeed preventing circuit operative, thereby limiting the engine speed.

In the inventive arrangement just described, when the conditions of the oil and/or cooling water become abnormal during operation of the engine, alarms are displayed by the first and second display units and the overspeed preventing circuit is made operative, so that the engine speed is controlled.

The present invention will be apparent from the following detailed description, taken in conjunction with the accompanying drawings.

DESCRIPTION OF THE PREFERRED EMBODIMENT

An embodiment of the present invention will now be described in detail with reference to the drawings.

Figure 1:
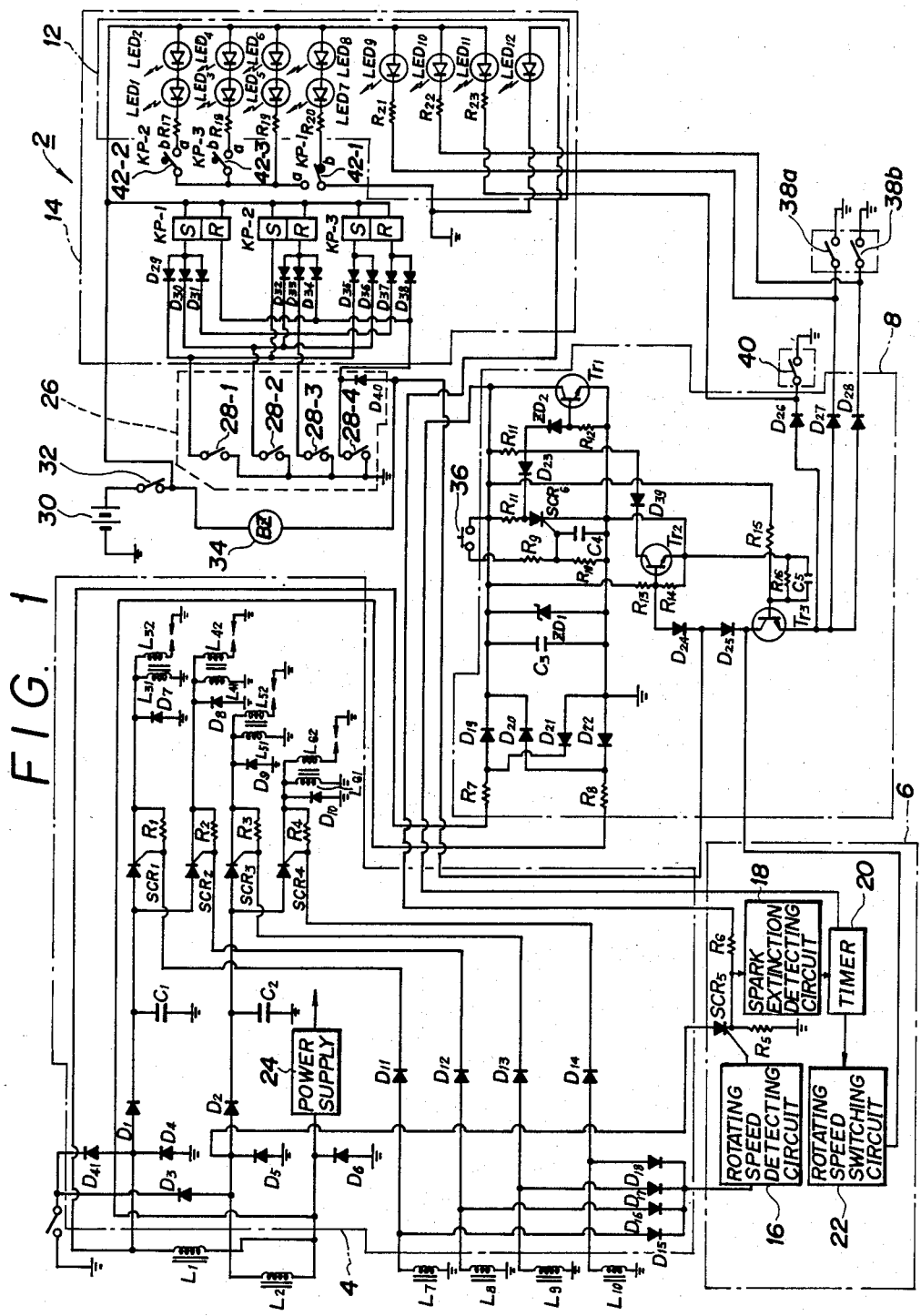
FIG. 1 is a circuit diagram of a display control apparatus for use with an internal combustion engine and embodying the present invention.
Figure 2:
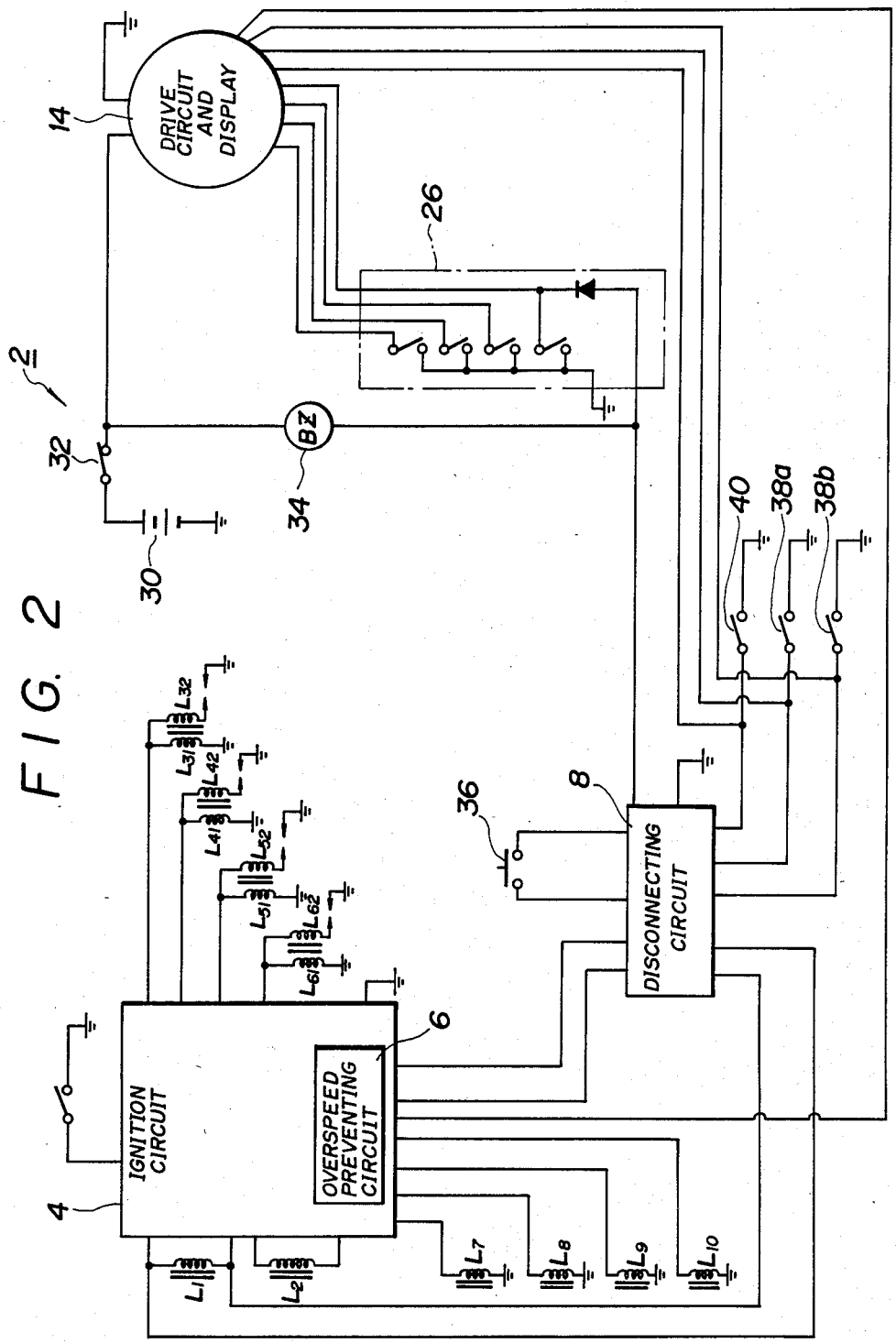
FIG. 2 is a block diagram of the display control apparatus of FIG. 1.
Figure 3:
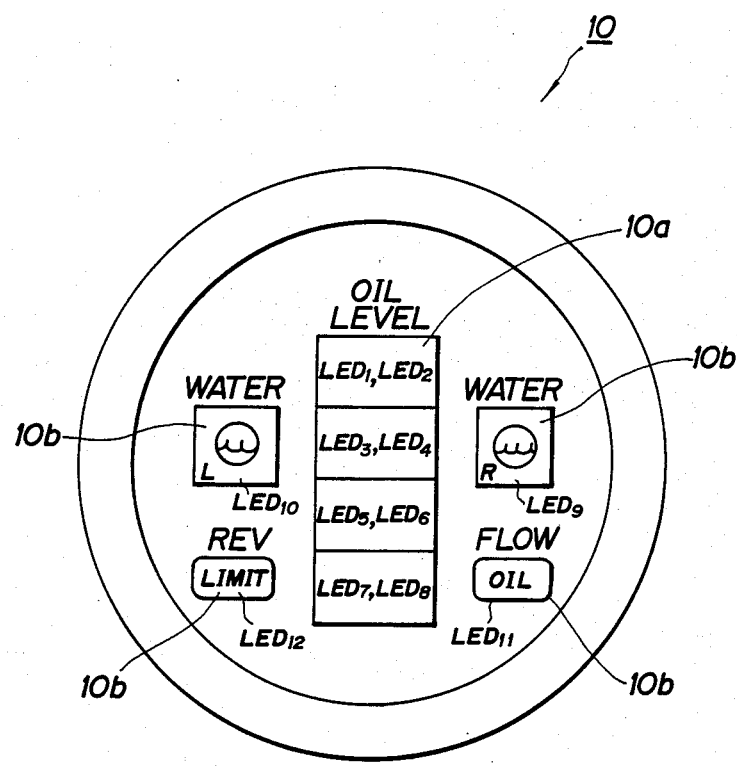
FIG. 3 is a front view of a display section which is a component of the apparatus shown in FIG. 1.
Figure 4:
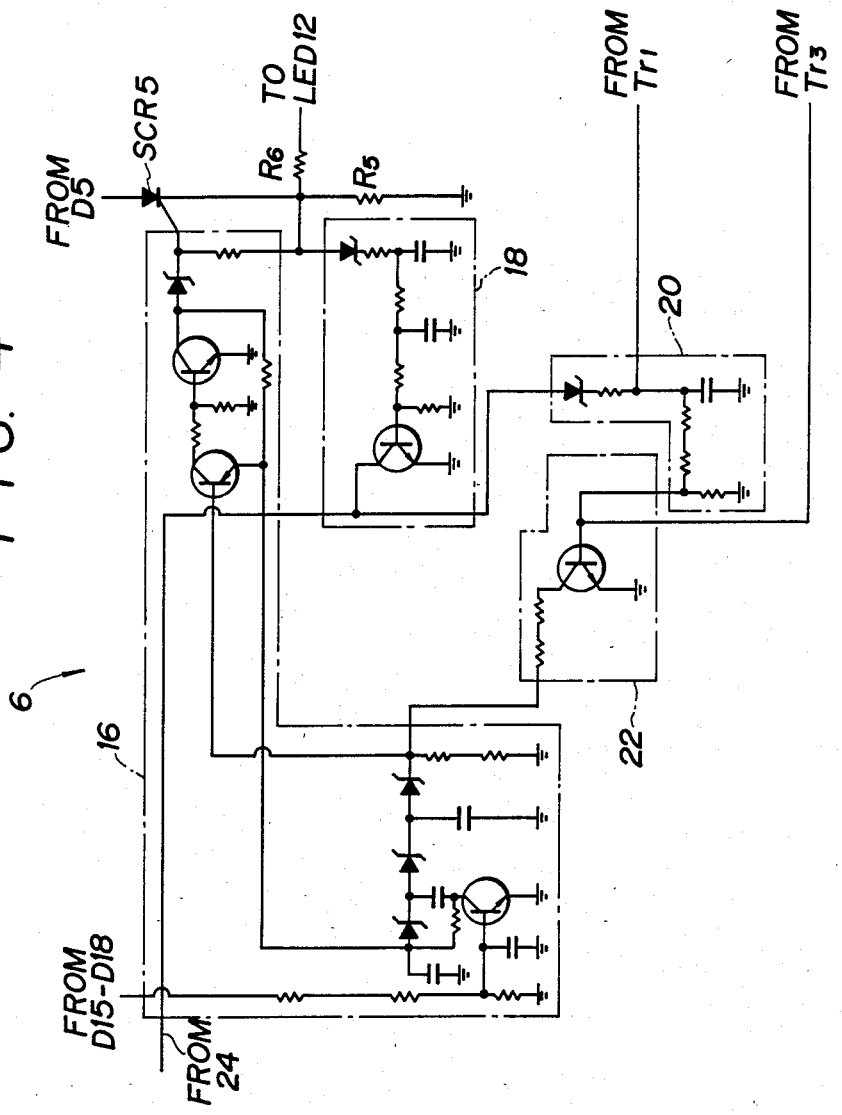
FIG. 4 is a schematic circuit diagram showing details of a portion of the circuit of FIG. 1.

In FIGS. 1 to 3, reference numeral 2 denotes a control circuit of a display control apparatus for an internal combustion engine. The control circuit 2 comprises: a CDI type ignition circuit 4 of the magnet type; an overspeed preventing circuit 6; a disconnecting circuit 8 to disconnect the overspeed preventing circuit a display circuit 12 having a first display unit 10a and a second display unit 10b; and a drive circuit 14 to make the display circuit 12 and overspeed preventing circuit 6 operative.

In the ignition circuit 4, outputs of capacitor charging coils $L_1$ and $L_2$ are rectified by diodes $D_1$ and $D_2$ and then capacitors $C_1$ and $C_2$ are charged, respectively. A gate voltage generated by a pulser coil $L_7$ is applied to a thyristor $SCR_1$ through a diode $D_{11}$, so that the charge in the capacitor $C_1$ is discharged and a primary side ignition coil $L_{31}$ of an ignition coil is discharged.

Thus, a high voltage spark signal is generated in a secondary side ignition coil $L_{32}$ and a spark is generated by a conventional spark plug (not shown). Further, in a manner similar to the case of the pulser coil $L_7$, gate voltages successively generated by pulser coils $L_8$, $L_9$, and $L_{10}$ are applied to thyristors $SCR_2$, $SCR_3$, and $SCR_4$ through diodes $D_{12}$, $D_{13}$, and $D_{14}$, respectively. Primary side ignition coils $L_{41}$, $L_{51}$, and $L_{61}$ are discharged due to charges in the capacitors $C_1$ and $C_2$, and high voltages are generated in secondary side ignition coils $L_{42}$, $L_{52}$, and $L_{62}$, respectively. Thus, a spark is generated by each of three more spark plugs (not shown).

The CDI type ignition circuit 4 and overspeed preventing circuit 6 are integrally constituted. The preventing circuit 6 is provided with a first mechanism to prevent the overspeed when the engine rotating speed exceeds a set value as the restricted value and a second mechanism to prevent the overspeed when the condition of an oil and/or cooling water becomes abnormal.

The overspeed preventing circuit 6 will now be described. The first mechanism of the preventing circuit 6 comprises: a thyristor $SCR_5$; a resistor $R_5$; a rotating speed detecting circuit 16 to turn on or off the thyristor $SCR_5$; a spark extinction detecting circuit 18 to detect spark extinction; a timer circuit 20 to measure the extinction time; and a set rotating speed switching circuit 22 to switch the set rotating speed to a low value when it is detected by the timer circuit 20 that the spark extinction state has continued for a set period of time.

An anode of the thyristor $SCR_5$ is connected to the charging coil $L_2$ provided for the ignition circuit 4, while a cathode is grounded through the resistor $R_5$. An output terminal of the speed detecting circuit 16 is connected to a gate of the thyristor $SCR_5$. The speed detecting circuit 16 receives outputs of the pulser coils $L_7$ to $L_{10}$, respectively, and supplies a current to the gate of the thyristor $SCR_5$ when the engine enters an overspeed state in which its speed is in excess of a predetermined speed and when the spark extinction state has continued for the set period of time. Due to this gate current, the thyristor $SCR_5$ short-circuits the capacitor charging coil $L_2$ of the ignition circuit 4. Thus, no spark is generated by the associated spark plugs and the engine speed is controlled to be a value lower than the predetermined speed.

When the engine rotating speed has reached a first predetermined speed and the repetitive state of spark extinction/ignition/spark extinction has continued for a set period of time, the first mechanism of the overspeed preventing circuit 6 forcedly switches the engine speed to a second predetermined speed lower than the first predetermined speed, thereby actively informing the driver of the overspeed state of the engine. Speaking in more detail, when the engine speed reaches the first predetermined speed and a signal is outputted from the speed detecting circuit 16 to turn on the thyristor $SCR_5$, an output current of the capacitor charging coil $L_2$ flows through the thyristor $SCR_5$. Then, the spark extinction detecting circuit 18 is made operative and this signal is inputted to the timer circuit 20. After expiration of the set period of time, a signal is sent from the timer circuit 20 to the set rotating speed switching circuit 22, so that the engine speed is switched from the first predetermined speed to the second predetermined speed. A power supply circuit 24 provides power to the speed detecting circuit 16.

On the other hand, in a case where the amount of engine oil or cooling water is reduced to a value below a predetermined level, where the oil circulation from an oil tank (not shown) is defective, or where the cooling water doesn't circulate in the engine, the second mechanism of the overspeed preventing circuit 6 reduces the engine speed to the second predetermined speed lower than the first predetermined speed in response to output signals from a group of oil level switches 26, which will be explained later, and sensors in respective sections. The group of oil level switches 26 are attached to the oil tank and composed of, for example, first, second, third, and fourth contacts 28-1, 28-2, 28-3, and 28-4, as well as conventional and not-illustrated components such as a float having a permanent magnet, a shaft and a cap.

The contacts 28-1 to 28-4 are turned on or off in accordance with the oil amount. When the oil tank is filled with oil, only the first contact 28-1 is turned on. As the oil amount decreases, the second, third, and fourth contacts 28-2 to 28-4 are sequentially turned on within a limited vertical range of the float.

Namely, as shown in FIG. 1, the first to fourth contacts 28-1 to 28-4 of the group of oil level switches 26 are vertically arranged in accordance with this sequence from the top. In this case, those contacts may be arranged either at regular intervals or at arbitrary intervals. Each of the first to fourth contacts is turned on at the position where it faces or in other words is vertically aligned with the float with the permanent magnet, and is turned off at other float positions. Therefore, when the oil tank is filled with oil, namely, when the float is located at the highest position, the first contact 28-1 arranged at the top position is turned on because it faces the float. The highest position of the float is set by providing a stopper for the shaft or by abutting the float on the bottom surface of the cap. When the float comes into contact with a stopper at the lowest position, the fourth contact 28-4 is turned on. Further, one end of each of the contacts of oil level switch 26 is connected to each of three keep relays KP-1, KP-2, and KP-3 of the drive circuit 14, and the other end is grounded. A battery 30, an ignition switch 32, and a buzzer 34 are connected in series to the fourth contact 28-4 through a diode $D_{40}$.

The disconnecting circuit 8 will now be described. In a case where cancellation of the overspeed prevention is not performed using switch 36 (as described later), the disconnecting circuit 8 respectively receives the outputs of the capacitor charging coils $L_1$ and $L_2$. These output signals are supplied through resistors $R_7$ and $R_8$ and diodes $D_{19}$, $D_{20}$, $D_{21}$, and $D_{22}$, so that a current flows through a capacitor $C_3$ and a Zener diode $ZD_1$. Then, the current flows through a resistor $R_{13}$ and a base of a transistor $Tr_2$ to ground, so that the transistor $Tr_2$ is turned on. In addition, the signal path between a resistor $R_{14}$ and the transistor $Tr_2$ is made conductive, so that a transistor $Tr_1$ is turned off.

In this state, when the oil in the oil tank decreases to a value below a predetermined level and the fourth contact 28-4 is turned on, current flows through the battery 30, ignition switch 32, buzzer 34, and fourth contact 28-4, so that a beep sound is generated from the buzzer 34. On the other hand, by short-circuiting the base-emitter of the transistor $Tr_2$ through a diode $D_{24}$, the transistor $Tr_2$ is turned off. Thus, a current flows through a resistor $R_{11}$, a Zener diode $ZD_2$, and the base and emitter of the transistor $Tr_1$ and the transistor $Tr_1$ is turned on. The timer circuit 20 is supplied with current due to the turn-on of the transistor $Tr_1$ and the timing operation of the timer circuit 20 is started.

In the case of canceling the overspeed prevention, for instance by turning on a reset switch 36, current flows from a voltage regulating circuit section through the reset switch 36 and resistors $R_9$ and $R_{10}$ to the ground. A thyristor $SCR_6$ is then turned on due to the voltage drop across the resistor $R_{10}$. The reset switch 36 may be the normally-open contact of the manual-set and self-reset type. In other words, the reset switch 36 is kept to OFF at any time except when it is manually set. The base-emitter of the transistor $Tr_1$ is short-circuited due to the turn-on of the thyristor $SCR_6$ to turn off the transistor $Tr_1$. The timer circuit 20 is made inoperative. Consequently, the overspeed preventing circuit 6 is disconnected and the overspeed prevention is canceled. When the engine is stopped, the thyristor $SCR_6$ is turned off and the canceling operating of the overspeed prevention is stopped. When the engine is restarted, the canceling operating of the overspeed The display circuit 12 will now be described. The display circuit 12 has a display section 10 as shown in FIG. 3. The display section 10 is provided with the first display unit 10a of the light on/off type and the second display unit 10b. The first display unit 10a consists of light emitting diodes $LED_1$ to $LED_8$ to display the oil level. The second display unit 10b consists of light emitting diodes $LED_9$ and $LED_{10}$ to display defective circulation of the cooling water, a light emitting diode $LED_{11}$ to display defective circulation of the oil, and a light emitting diode $LED_{12}$ to display limitation of the engine speed. The term light emitting diode is abbreviated as LED hereinafter for convenience of explanation. As shown in FIG. 3, every two LEDs of the first display unit 10a form one pair. Namely, a pair of diodes $LED_1$ and $LED_2$ constitute the first stage (corresponding to the highest position) of the oil level. In a manner similar to the above, the second to fourth stages are constituted by pairs of LEDs. The color of $LED_1$ to $LED_6$ of the first to third stages is preferably green. The color of $LED_7$ and $LED_8$ of the fourth stage is preferably red. In addition, the color of $LED_9$ to $LED_{12}$ is also set to red. With this constitution, when an abnormal condition with regard to the oil amount or circulation of the oil or cooling water or the like is detected, it can be positively presented as an alarm condition by red light emission.

One end of each of the diodes $LED_1$ to $LED_{11}$ of the display circuit 12 is connected to the keep relays KP-1 to KP-3 of the drive circuit 14, which will be explained later. The other ends of the diodes $LED_1$ to $LED_8$ are connected to the battery 30 through the ignition switch 32. The other ends of the diodes $LED_9$ and $LED_{10}$ are connected to water sensors 38a and 38b respectively. When circulation of the cooling water is defective, the water sensors 38a and 38b are turned on. Further, the other end of $LED_{11}$ is connected to an oil flow sensor 40, which is turned on when circulation of the oil is defective. One end of the $LED_{12}$ is grounded and the other end is connected through a resistor $R_6$ to the spark extinction detecting circuit 18 of the overspeed preventing circuit 6.

The drive circuit 14 will now be described. The first to fourth contacts 28-1 to 28-4 of the group of oil level switches 26 are respectively connected to one end of the drive circuit 14, and the display circuit 12 is connected to the other end. Practically speaking, the drive circuit 14 has the three keep relays KP-1 to KP-3. These keep relays comprise: contacts 42-1, 42-2, and 42-3; coils (S and R) to attract the contacts 42-1 to 42-3; and permanent magnets to hold each contact in its most recent position caused by the supply of current to the corresponding coils, even if the power supply stops. The first to fourth contacts 28-1 to 28-4 are respectively connected to the coils through diodes $D_{29}$ to $D_{38}$. The diodes $LED_1$ to $LED_8$ are respectively connected to the contacts 42-1 to 42-3 through resistors $R_{17}$ to $R_{20}$.

The operation of the inventive apparatus will now be described.

When a rotor having a permanent magnet (not shown) rotates synchronously with the crankshaft of the engine, electromotive forces are sequentially generated in the capacitor charging coils $L_1$ and $L_2$. A current flows through the coil $L_1$, diode $D_1$, and capacitor $C_1$ and also through the coil $L_2$, diode $D_2$, and capacitor $C_2$ due to the electromotive forces, so that the capacitors $C_1$ and $C_2$ are charged, respectively. When the rotor further rotates, electromotive forces are also sequentially generated in the pulser coils $L_7$ to $L_{10}$. Thus, current flows through pulser coil $L_7$, diode $D_{11}$, the gate of thyristor $SCR_1$, and primary side ignition coil $L_{31}$ of the ignition coil, thereby turning on the thyristor $SCR_1$ which was in the OFF state. Due to this, the charges in the capacitor $C_1$ are applied through the thyristor $SCR_1$ to the coil $L_{31}$ and the coil $L_{31}$ is discharged. Then, a high voltage is developed in the secondary side ignition coil $L_{32}$ of the ignition coil, causing a spark to be generated from the spark plug. In this case, the currents produced due to the electromotive forces generated in the pulser coils $L_8$ to $L_{10}$ also cause the thyristors $SCR_2$ to $SCR_4$ to be turned on, respectively, in a manner similar to the case of the pulser coil $L_7$. Thus, high voltages are respectively generated in the secondary side ignition coils $L_{42}$, $L_{52}$, and $L_{62}$ and sparks are generated from the associated spark plugs, thereby driving the engine.

For example, in the case of a boat where the pitch of the propeller is small and the engine in the running state enters the overspeed state above a first predetermined rotating speed, the outputs of the pulser coils $L_7$ to $L_{10}$ are supplied to the speed detecting circuit 16. When the engine speed reaches the first predetermined speed, a signal is outputted from the speed detecting circuit 16 and supplied to the gate of the thyristor $SCR_5$ to turn on the thyristor $SCR_5$. Thus, the output of the coil $L_2$ is short-circuited by the thyristor $SCR_5$ and the capacitor $C_2$ is not charged. Consequently, high voltages are not generated in the secondary side ignition coils $L_{52}$ and $L_{62}$ and no spark is generated from the associated spark plugs, thereby restricting any increase in engine speed and in fact producing a small decrease. When the engine speed is thus slightly decreased, the signal out of the speed detecting circuit 16 is turned off and the thyristor $SCR_5$ is turned off so that sparks are again generated normally. By repeating the above operation, the engine speed is maintained close to the first predetermined speed. On the other hand, when the engine speed reaches the first predetermined speed and the repetitive cycle of the spark extinction/ignition/spark extinction, etc. continues for a predetermined time, for example a few seconds, signals are repeatedly output from the speed detecting circuit 16 to the thyristor $SCR_5$ to turn on the thyristor $SCR_5$. The output current of the coil $L_2$ flows through the thyristor $SCR_5$. Thus, the spark extinction detecting circuit 18 is made operative and a signal is outputted therefrom to the timer circuit 20.

After an expiration of a set period of time, a signal is sent from the timer circuit 20 to the set speed switching circuit 22, thereby causing the engine speed to be switched from the first predetermined speed to the second predetermined speed. For example, it is now assumed that the first and second predetermined speeds are 6000 rpm and 3000 rpm, respectively, and that the set period of time until the engine speed is switched from the first predetermined speed to the second predetermined speed is ten seconds. In this case, when the engine speed reaches 6000 rpm, the engine enters the spark extinction state and a further increase in engine speed is stopped. However, if the spark extinction/ignition/spark extinction cycle was repeated indefinitely, the engine would receive a large shock; therefore, such a repetitive state is undesirable. To prevent this, if this state continues for a predetermined period of time, for example ten seconds, then the engine speed is switched from 6000 rpm to 3000 rpm, thereby actively informing the driver of the occurrence of the overspeed preventing state.

In this case where the oil tank is filled with oil or is nearly full of oil, the float with the permanent magnet is at substantially its highest position, so that the first contact 28-1 is turned on as mentioned above. When the ignition switch 32 is turned on in this state, a current flows from the battery 30 through the coil S of the keep relay KP-1, diode $D_{29}$, and the first contact 28-1 to ground. The current simultaneously flows through the coil S of the keep relay KP-2 and first contact 28-1 to ground, and further through the coil S of the keep relay KP-3, diode $D_{35}$, and first contact 28-1 to ground. Consequently, the contacts of the keep relays KP-1, KP-2, and KP-3 are each moved to the terminal and made conductive due to the attracting forces of the coils S, respectively. Thus, the current from the battery 30 flows through $LED_2$, $LED_1$, resistor $R_{17}$, and keep relays KP-2, and KP-1 to ground. At the same time, current flows through $LED_4$, $LED_3$, resistor $R_{18}$, and keep relays KP-3 and KP-1 to ground, and further through $LED_6$, $LED_5$, resistor $R_{19}$, and keep relays KP-1 to ground. Thus, $LED_1$ to $LED_6$ are lit up. In other words, the first to third stages of the first display unit 10a are lit up. By driving the engine, the oil amount in the oil tank will be reduced, and the float will descend, so that the first contact 28-1 of the group of oil level switches 26 is turned off. However, the keep relays KP-1 to KP-3 hold their initial states due to the permanent magnets, so that the respective contacts of those keep relays are kept to ON, thereby allowing $LED_1$ to $LED_6$ to be continuously lit.

On the other hand, when the oil amount decreases sufficiently so that the float faces the second contact 28-2, the second contact 28-2 is turned on and current from the battery 30 flows through the coil S of the keep relay KP-1, diode $D_{30}$, and second contact 28-2 to ground. At the same time, current flows through the coil R of the keep relay KP-2, diode $D_{32}$, and second contact 28-2 to ground, and further through the coil S of the keep relay KP-3, diode $D_{36}$, and second contact 28-2 to ground. Thus, the contact of the keep relay KP-1 is held to its terminal a. In contrast, since its coil R is turned on, the contact of the keep relay KP-2 is moved to its terminal b because the attracting force produced by the energized coil R is larger than the attracting force of the permanent magnet. The contact of the keep relay KP-3 is held to its terminal a. Thus, $LED_3$ to $LED_6$ remain continuously lit. Since the contact of the keep relay KP-2 is switched to the terminal b, the circuits driving $LED_1$ and $LED_2$ are disconnected, so that these LEDs are turned off. Namely, the first stage of the first display unit 10a is turned off. Thereafter, the second contact 28-2 is turned off due to a further reduction of the oil amount, similar to the first contact 28-1. Since the keep relay KP-2 is kept to ON, the $LED_3$ to $LED_6$ remain continuously lit.

When the oil amount further decreases and the float faces the third contact 28-3 and this contact is turned on, current from the battery 30 flows through the coil S of the keep relay KP-1, diode $D_{31}$, and third contact 28-3 to ground. At the same time, current flows through the coil R of the keep relay KP-2, diode $D_{33}$, and third contact 28-3 to ground, and further through the coil R of the keep relay KP-3 and third contact 28-3 to ground. Thus, the contact of the keep relay KP-1 is held to its terminal a, the contact of the keep relay KP-2 is held to its terminal b, and the contact of the keep relay KP-3 is switched from the terminal a to the terminal b. Consequently, the circuits for $LED_1$ to $LED_4$ are disconnected and turned off, but the circuits for $LED_5$ and $LED_6$ keep their conductive states and are continuously lit. At this time, the second stage of the first display unit 10a is also turned off, subsequent to the first stage. On the other hand, even when the third contact 28-3 is later turned off due to a further reduction of the oil amount, the keep relay KP-3 is held ON, so that the conducting state of the circuit is held and the $LED_5$ and $LED_6$ remain continuously lit.

When the oil amount is further reduced and the fourth contact 28-4 faces the float and is turned on, current from the battery 30 flows through the coil R of the keep relay KP-1 and fourth contact 28-4 to ground, thereby allowing the contact of the keep relay KP-1 to be switched from the terminal a to the terminal b. Thus, the circuits for $LED_5$ and $LED_6$, which have been lit, are disconnected, and they are turned off. At the same time, the circuits for $LED_7$ and $LED_8$ are made conductive to light $LED_7$ and $LED_8$. The third stage of the first display unit 10a is thus turned off and red $LED_7$ and $LED_8$ of the fourth stage are lit. Due to the turn-on of the fourth contact 28-4, the driver is warned that the oil needs to be supplemented. In addition to the lighting up of the red LEDs ($LED_7$ and $LED_8$) of the first display unit 10a, current from the battery 30 simultaneously flows through the buzzer 34, diode $D_{40}$, and fourth contact 28-4 to ground, so that a beeping sound is generated by the buzzer. Further, this causes the disconnecting circuit 8 to limit the engine speed.

The disconnecting circuit 8 receives the outputs of the capacitor charging coils $L_1$ and $L_2$ as power sources and supplies them to the diodes $D_{19}$ to $D_{22}$, capacitor $C_3$, and Zener diode $ZD_1$. The current is rectified and smoothed, and is then regulated by the Zener diode $ZD_1$, and flows through the resistor $R_{13}$ and base of transistor $Tr_2$ to ground, thereby turning on the transistor $Tr_2$. Due to this, current flows through diodes $D_{19}$, $D_{20}$, resistor $R_{11}$, diode $D_{39}$, and transistor $Tr_2$ to ground, thereby short-circuiting the collector and emitter of transistor $Tr_1$ and turning off the transistor $Tr_1$. At this time, the overspeed preventing circuit 6 will not be influenced. However, when the transistor $Tr_2$ is turned off, current flows through the previously short-circuited base and emitter of the transistor $Tr_1$ to turn on the transistor $Tr_1$. A part of the timer circuit 20 is short-circuited by the transistor $Tr_1$. Thus, the timer circuit 20 starts operating and, after the elapse of a set period of time, a signal is sent to the set speed switching circuit 22. The engine speed is switched to the second predetermined speed and the reduction of the oil amount is thus actively relayed to the driver so that the driver will supplement the oil. At this time, the $LED_{12}$ of the second display unit 10b is lit by current flowing through the thyristor $SCR_5$ of the overspeed preventing circuit 6, thereby informing the driver of the fact that the overspeed preventing circuit is operating. Namely, since the current flows through the coil $L_2$, thyristor $SCR_5$, and resistor $R_5$ to ground, current flows through the thyristor $SCR_5$, resistor $R_6$, and $LED_{12}$ to ground, so that $LED_{12}$ is turned on. Thus, when the fourth contact 28-4 is turned on, $LED_7$ and $LED_8$ of the first display unit 10a are lit and a beeping sound is also generated from the buzzer 34. When the engine is driving at a speed above the second predetermined speed of the overspeed preventing circuit 6, the rotating speed limiting operation is effected and the necessity to supplement the oil is relayed to the driver. In the display section 10, the red LEDs ($LED_7$ and $LED_8$) of the fourth stage are lit to display that the residual oil amount is small, and the red $LED_{12}$ is lit to display that the overspeed preventing operation is being performed. Thus, the warning can be confirmed by the eyes and ears of the driver.

In the case of the warning for a decrease in the oil amount, an alarm is normally produced before the oil tank becomes empty, in other words when an amount of oil sufficient to enable the engine to be driven still remains in the oil tank. If a disaster, a necessity for emergency refuge for the avoidance of a disaster, or the like occurs when the fourth contact 28-4 has been turned on and the rotating speed restriction is being performed, the overspeed prevention (rotating speed restriction) can be cancelled as will be explained hereinafter. Namely, by temporarily turning on the reset switch 36 of the disconnecting circuit 8 while the engine is operating, current flows through diodes $D_{19}$, $D_{20}$, reset switch 36, resistor $R_9$, and the gate of thyristor $SCR_6$ to ground, so that the thyristor $SCR_6$ is turned on. Due to this, the base and emitter of transistor $Tr_1$ are short-circuited, the transistor $Tr_1$ is turned off, and a part of the timer circuit 20 is disconnected. The rotating speed restriction is cancelled in this way. Consequently, ordinary running can be performed. However, to remind the driver of the lack of oil due to the decrease in the oil amount, the red LEDs of the fourth stage of the first display unit 10a remain continuously lit and the beeping sound is also continuously generated by the buzzer. As described above, the reset switch 36 is temporarily turned on by a manual operation, and after completion of the manual operation is automatically reset to its OFF state (that is, its normally-open state). Thus, when the engine is started or restarted, the reset switch 36 is always in the OFF state, thereby making it possible to start or restart the engine.

When the engine is temporarily stopped and then restarted after reaching the emergency refuge, the thyristor $SCR^5$ is OFF and the rotating speed limiting operation is effected. By newly supplying oil into the oil tank, the red LEDs ($LED_7$ and $LED_8$) of the first display unit 10a are turned off and the green LEDs ($LED_1$ through $LED_6$) are then lit and, at the same time, the generation of the beeping sound from the buzzer is stopped and the speed restriction is cancelled.

According to the illustrated embodiment, since the oil amount in the oil tank is displayed by the LEDs on the basis of the light on/off method, the driver can easily perceive and check the oil amount. In addition, once a keep relay has received a control signal, it holds its state even if the power supply is stopped. Therefore, by merely inputting an ON signal with a narrow range to the keep relay, the same display can be continued until the next control signal occurs. The advantages that the circuit is simplified and that there is no need to always supply power are thus obtained.

The display of the circulating state of the cooling water will now be described. The water sensors 38a and 38b are attached to the cylinder head cover or at a location near it. At the start of the engine, the water pump is driven to move cooling water. The water sensors 38a and 38b detect whether the cooling water circulates normally in the jacket portion of the cylinder or not. The display mechanism of the cooling water comprises: the water sensors 38a and 38b; $LED_9$ and $LED_{10}$ of the second display unit 10b to display the presence or absence of cooling water by the signals from the sensors; the overspeed preventing circuit 6 to restrict the rotating speed in response to the signals indicative of the presence or absence of the cooling water; and $LED_{12}$ of the second display unit 10b to inform the driver that the state of rotating speed restriction is in effect.

Before the engine is started, no cooling water exists in the cylinder, and the water sensors 38a and 38b are thus in the ON state. When the ignition switch 32 is turned on, and before the engine is started, the current from the battery 30 flows through the $LED_9$ and water sensor 38a to ground, and through the $LED_{10}$ and water sensor 38b to ground. Thus, $LED_9$, and $LED_{10}$ are lit. As already mentioned, the colors of these LEDs are preferably set to red, and a warning is thus actively presented to the driver by the lighting up of these red lights.

At the start of the engine, currents from the coils $L_1$ and $L_2$ flow through the diodes $D_{19}$ and $D_{20}$, a resistor $R_{15}$, the base of a transistor $Tr_3$, and water sensors 38a and 38b to ground. Thus, the transistor $Tr_3$ is turned on and current from the battery 30 flows through the ignition switch 32, buzzer 34, diode $D_{25}$, transistor $Tr_3$, diodes $D_{27}$ and $D_{28}$ and water sensors 38a and 38b to ground. Simultaneously, a part of the set speed switching circuit 22 is short-circuited because current flows through the transistor $Tr_3$, diodes $D_{27}$ and $D_{28}$ and water sensors 38a and 38b to ground. Thus, the circuit of the buzzer 34 is connected and a beeping sound is generated therefrom simultaneously with the start of the engine. When the cooling water starts circulating in the jacket portion of the cylinder (after expiration of a few seconds), the water sensors 38a and 38b are turned off to disconnect the circuits of $LED_9$ and $LED_{10}$, buzzer 34 and set speed switching circuit 22. $LED_9$ and $LED_{10}$ are turned off, and the generation of the beeping sound from the buzzer 34 is stopped, thereby informing the driver of the fact that the cooling water has started circulating in the cylinder. If the cooling water doesn't circulate properly because of some abnormal condition or the like, at least one of $LED_9$ and $LED_{10}$ will remain on and the beeping sound will continue to be generated from the buzzer 34, thereby informing the driver of the defective circulating state of the cooling water.

Further, when the engine is driving at a speed above the second predetermined speed, if the defective circulating state of the cooling water occurs due to some abnormal condition or the like, at least one of the water sensors 38a and 38b will be turned on to light up at least one of $LED_9$ and $LED_{10}$ and to generate a beeping sound from the buzzer 34. In addition, since the set speed switching circuit 22 is short-circuited, the signal is sent to the speed detecting circuit 16 which causes it to drive the engine at the second predetermined speed. A signal is thus outputted from the speed detecting circuit 16 to the gate of the thyristor $SCR_5$, so that the thyristor $SCR_5$ is turned on and ignition through the secondary side ignition coils $L_{52}$ and $L_{62}$ is stopped and the engine speed is restricted. At this time, a part of the current flowing through the thyristor $SCR_5$ flows through $LED_{12}$ of the second display unit 10b, and $LED_{12}$ is lit. In this way, the driver can perceive that the rotating speed is being restricted.

Consequently, the presence/absence of the abnormal circulating condition of the cooling water before and during driving of the engine can be promptly relayed to the driver, so that the driver can determine the reason why the rotating speed restricting operation is being executed.

The display of the oil flow state will now be described. The oil flow state, that is the circulating state of the oil, is detected by the oil flow sensor 40, which for example is provided between the not-illustrated oil tank and oil pump. For example, if the oil circulation becomes defective due to some abnormal condition or the like, the oil flow sensor 40 is turned on. On the basis of the on/off signal from the oil flow sensor 40, the rotating speed restricting operation is executed in a manner similar to the case of the water sensors 38a and 38b. Thus, the driver can know whether the oil circulating state is normal or not on the basis of the on/off condition of $LED_{11}$ of the second display unit 10b and the generation of the beeping sound from the buzzer 34.

When the engine is in the overspeed state, the ignition is restricted to the first predetermined speed, thereby preventing an increase in engine speed. At the same time, $LED_{12}$ is lit up by the current flowing through the thyristor $SCR_5$, thereby informing the driver of the execution of the overspeed preventing operation. Consequently, if only the $LED_{12}$ is lit in the second display unit 10b, the driver can perceive that the oil or cooling water is not abnormal and only the overspeed preventing operation is being executed.

When the abnormal state of the oil or cooling water is also simultaneously detected, the above-mentioned operations are performed in parallel.

The power supply circuit 24 connected to the capacitor charging coil $L_2$ of the ignition circuit 4 provides power to the display circuit 12 which can indicate that the engine is in the overspeed state.

The present invention is not limited to the foregoing embodiments, because many modifications and variations, including the rearrangement of parts, are possible within the spirit and scope of the invention.

For example, four contacts in the group of oil level switches were used in the foregoing embodiment of the invention. However, the number of contacts may be increased or decreased to an arbitrary value.

Although a pair of two light emitting diodes were used for each stage to display the oil amount in the first display unit, one LED or a set of three or more LEDs may be used.

Further, in place of the light emitting diodes of the first and second display units, lamps or liquid crystal displays may be also used. Although lead switches were used as the contacts of the group of oil level switches, Hall effect devices may be used as well.

In the embodiment of the invention, a respective water sensor was attached to each of the right and left cylinders in consideration of the V-type engine. However, in the case of an in-line engine, only one water sensor may be used, or different water sensors may be attached at different vertical positions.

Only the operation to detect the oil amount has been described in the embodiment of the invention. However, in addition to the oil amount, the amount of cooling water may be detected, and when the water is too low, it may be displayed by the second display unit and at the same time the engine speed can be also restricted.

According to the present invention, as described in detail above, there is provided a display control apparatus which includes: a first display unit of the light on/off type to display the amounts of oil and/or cooling water; a second display unit to display the circulating states of the oil and/or cooling water; and a drive circuit which, when an abnormal state of the oil or cooling water occurs, switches the first and second display units to cause a warning to be displayed, and also limits the engine rotating speed. The amounts of oil and cooling water are displayed on a multistep basis, and a light on/off arrangement is used so that the driver can perceive the oil amount, and this method is actually advantageous. On one hand, when the display area of the first display unit is changed, by merely inputting a signal once, the resulting state is held until a further signal is inputted. Thus, the structure of each contact portion can be simplified and the cost can be also reduced. Further, by the use of keep relays in the drive circuit, there is no need to use an auxiliary power supply to store the state of the display before the main power supply is disconnected, and this method is economically advantageous. Moreover, when abnormal conditions of the oil and cooling water are detected, an alarm is presented using the LEDs of the display section and, at the same time, the engine speed is limited and the execution of the engine speed control operation is also displayed. Thus, the driver can clearly know which abnormal state caused the engine speed restriction to be performed. The method of using the engine can thus be improved.

What is claimed is:

1. A display apparatus for indicating the level of a fluid in a fluid container, comprising: a float switch which is disposed in said container and which includes a plurality of vertically spaced level switches and a vertically movable float, each said level switch being actuated by said float when said float is substantially vertically aligned therewith; keep means responsive to said float switch and having a plurality of operational states which correspond in number to the number of said level switches of said float switch, wherein in response to actuation of each said level switch said keep means is set to a respective one of said operational states and remains therein after deactuation of such level switch until set to a different said operational state by actuation of a different said level switch; and display means responsive to said keep means for providing an operator perceptible display of the operational state to which said keep means is currently set; wherein said float switch has a first said level switch which is the uppermost of said level switches, a second said level switch below said first level switch, a third said level switch below said second level switch, and a fourth said level switch below said third level switch; wherein said keep means is respectively set to first, second, third and fourth said operational states in response to actuation of said first, second, third and fourth level switches, respectively; wherein said display means includes a first light element, a second light element disposed below said first light element, a third light element disposed below said second light element, and a fourth light element disposed below said third light element; wherein said first, second and third light elements are actuated and said fourth light element is deactuated when said keep means is in said first operational state, wherein said second and third light elements are actuated and said first and fourth light elements are deactuated when said keep means is in said second operational state; wherein said third light element is actuated and said first, second and fourth light elements are deactuated when said keep means is in said third operational state, and wherein said fourth light element is actuated and said first, second and third light elements are deactuated when said keep means is in said fourth operational state.

2. The display apparatus of claim 1, wherein said first, second and third light elements emit green light when actuated and said fourth light element emits red light when actuated.

3. The display apparatus of claim 1, wherein said keep means includes first, second and third keep relays, said first keep relay being set in response to actuation of one of said first, second and third level switches and being rest in response to actuation of said fourth level switch, said second keep relay being set in response to actuation of said first level switch and being rest in response to actuation of one of said second, third and fourth level switches, and said third keep relay being set in response to actuation off one of said first and second level switches and being reset in response to actuation of one of said third and fourth level switches.

4. The display apparatus of claim 3, wherein said first light element is actuated when said first and second keep relays are set, wherein said second light element is actuated when said first and third keep relays are set, wherein said third light element is actuated when said first keep relay is set, and wherein said fourth light element is actuated when said first keep relay is reset.

5. A display apparatus for use with an engine comprising: an oil level indicator which includes first, second and third light elements which emit a first light color when actuated and a fourth light element which emits a second light color when actuated, said second light element being disposed below said first light element, said third light element being disposed below said second light element, and said fourth light element being disposed below said third light element; and means responsive to a high level of oil in the engine for causing said first, second and third light elements to be actuated and said fourth light element to be deactuated, and responsive to a subsequent progressive decrease of the oil level for causing said first and second light elements to be successively deactuated and for thereafter causing said third element to be deactuated and said fourth light element to be actuated.

6. The display apparatus according to claim 5, wherein said first color is green and said second color is red.

7. The display apparatus of claim 6, wherein each said light element includes a pair of adjacent light emitting diodes.

8. The display apparatus of claim 5, including first and second water flow indicator lights respectively disposed on opposite sides of said oil level indicator, and including means responsive to an inadequate flow of cooling water at first and second locations within the engine for respectively actuating said first and second water flow indicator lights.

9. The display apparatus of claim 8, including an oil flow indicator light disposed below said first water flow indicator light, and including means responsive to an inadequate flow of oil within the engine for actuating said oil flow indicator light.

10. The display apparatus of claim 9, including a limit indicator light disposed below said first water flow indicator light, and means responsive to selective suppression of sparks by the engine for actuating said limit indicator light.

11. The display apparatus of claim 10, including a buzzer, and means responsive to a predetermined abnormal operating state of the engine for actuating said buzzer.

12. The display apparatus of claim 11, including a substantially circular display panel having said oil level indicator, said water flow indicator lights, said oil flow indicator light, and said limit indicator light provided thereon.

* * * * *

UNITED STATES PATENT AND TRADEMARK OFFICE
CERTIFICATE OF CORRECTION

PATENT NO. : 4 887 068

DATED : December 12, 1989

INVENTOR(S) : Kazuhiro UMEHARA

It is certified that error appears in the above-identified patent and that said Letters Patent is hereby corrected as shown below:

Column 15, line 28; change "rest" to ---reset---.

line 30; change "rest" to ---reset---.

Signed and Sealed this

Twenty-fifth Day of December, 1990

Attest:

HARRY F. MANBECK, JR.

*Attesting Officer*     *Commissioner of Patents and Trademarks*